(12) United States Patent
Brandt et al.

(10) Patent No.: US 11,720,493 B2
(45) Date of Patent: *Aug. 8, 2023

(54) CACHE MANAGEMENT BASED ON MEMORY DEVICE OVER-PROVISIONING

(71) Applicant: Micron Technology, Inc., Boise, ID (US)

(72) Inventors: Kevin R. Brandt, Boise, ID (US);
Peter Feeley, Boise, ID (US); Kishore Kumar Muchherla, Fremont, CA (US);
Yun Li, Fremont, CA (US); Sampath K. Ratnam, Boise, ID (US); Ashutosh Malshe, Fremont, CA (US);
Christopher S. Hale, Boise, ID (US);
Daniel J. Hubbard, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,108

(22) Filed: Jan. 21, 2022

(65) Prior Publication Data
US 2022/0156187 A1 May 19, 2022

Related U.S. Application Data

(63) Continuation of application No. 17/097,477, filed on Nov. 13, 2020, now Pat. No. 11,256,620.

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .......................... G06F 12/0802; G06F 2212/60
See application file for complete search history.

(56) References Cited

U.S. PATENT DOCUMENTS

| 2003/0065886 | A1* | 4/2003 | Olarig ..................... G06F 12/12 711/121 |
| 2009/0327591 | A1* | 12/2009 | Moshayedi ........... G06F 3/0688 711/E12.001 |
| 2012/0311293 | A1 | 12/2012 | Nemazie et al. |
| 2013/0198457 | A1 | 8/2013 | Kobayashi et al. |
| 2016/0077968 | A1 | 3/2016 | Sela et al. |
| 2016/0098350 | A1 | 4/2016 | Tang et al. |
| 2016/0217071 | A1 | 7/2016 | Hu et al. |

OTHER PUBLICATIONS

PCT Notification of Transmittal Of The International Search Report And The Written Opinion Of The International Searching Authority for PCT Application No. PCT/US2021/058911, dated Feb. 25, 2022, 9 pages.

* cited by examiner

*Primary Examiner* — Jae U Yu
(74) *Attorney, Agent, or Firm* — Lowenstein Sandler LLP

(57) ABSTRACT

System and methods are disclosed include a memory device and a processing device coupled to the memory device. The processing device can determine an amount of valid management units in a memory device of a memory sub-system. The processing device can then determine a surplus amount of valid management units on the memory device based on the amount of valid management units. The processing device can then configure a size of a cache of the memory device based on the surplus amount of valid management units.

20 Claims, 4 Drawing Sheets

US 11,720,493 B2

CACHE MANAGEMENT BASED ON MEMORY DEVICE OVER-PROVISIONING

RELATED APPLICATION

This application is a continuation of U.S. patent application Ser. No. 17/097,477, filed Nov. 13, 2020, the entire content of which is hereby incorporated by reference.

TECHNICAL FIELD

Embodiments of the disclosure relate generally to memory sub-systems, and more specifically, relate to cache management based on memory device over-provisioning.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
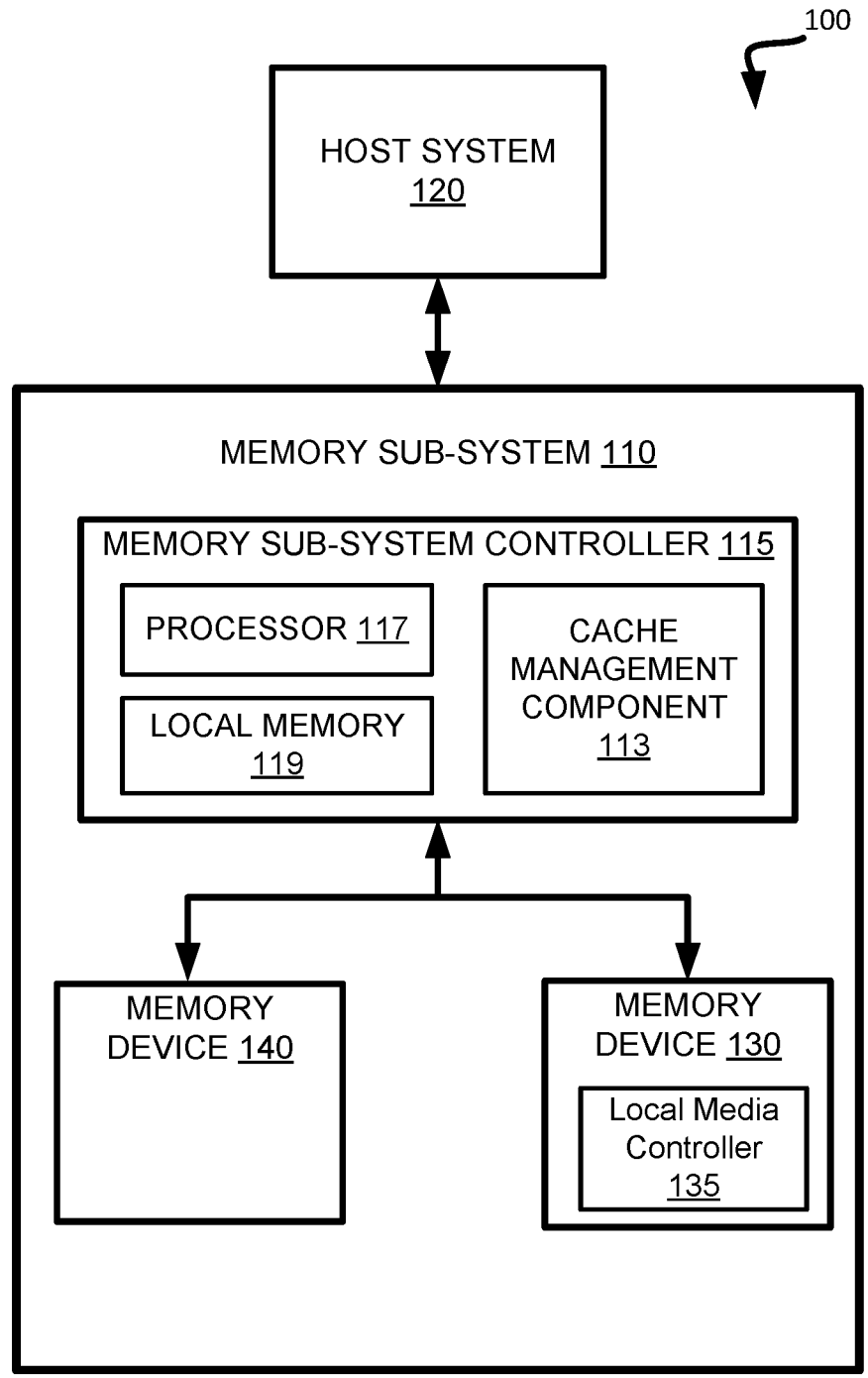
FIG. 1 illustrates an example computing environment that includes a memory sub-system in accordance with some embodiments of the present disclosure.

Aspects of the present disclosure are directed to reprogramming blocks based on frequency of access. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. A block hereinafter refers to a unit of the memory device used to store data and can include a group of memory cells, a word line group, a word line, or individual memory cells. Each block can include a number of sub-blocks, where each sub-block is defined by an associated pillar (e.g., a vertical conductive trace) extending from a shared bit line. Memory pages (also referred to herein as "pages") store one or more bits of binary data corresponding to data received from the host system.

For example, a memory device can include single-level cells (SLCs) that each store one bit of data, multi-level cells (MLCs) that each store two bits of data, triple-level cells (TLCs) that each store three bits of data and/or quad-level cells (QLCs) that each store four bits of data. Each type of memory cell (e.g., SLCs, MLCs, TLCs and QLCs) can exhibit different characteristics and advantages. For example, an SLC can have a lower read latency (e.g., how long it takes for data stored at the SLC to be read), a faster programming time (e.g., how long it takes to program data received from the host system to the cell for storage) and a greater reliability for data stored at the SLC than the other types of memory cells. However, since each SLC only stores a single bit of data, a memory device including SLCs will have a lower storage capacity when compared to a memory device having the same total number of memory cells, but including at least some MLCs, TLCs and/or QLCs, which store multiple bits of data per memory cell.

Although SLCs offer superior performance characteristics, manufacturing memory devices that include only SLC memory cells can be less cost-effective in comparison with memory devices having higher density cells (e.g., MLCs, TLCs and QLCs), which store more bits per cell. Accordingly, some memory cells can be configured as SLCs, while the rest of the memory cells can be higher density cells. Data is first written to the SLC portion of the memory device and later transferred to a higher density portion of the memory device when the memory sub-system is not busy servicing host requests. The use of SLC cells in this way can be termed a "SLC cache." The SLC cache provides a balance between the speed of SLC memory cells with the storage capacity of higher density memory cells.

In some memory implementations, the size of the SLC cache is fixed at the device manufacturing time (i.e., "fixed-size SLC cache"). In other implementations, the cache size can vary during usage (i.e., "dynamic-size SLC cache") since the density of memory cells can be reconfigurable by firmware. In memory devices featuring dynamic-size SLC caches, the cache size is typically varied based upon how full the memory device is. As the device fills up, memory cells configured as SLC cache are migrated to higher density memory cells to increase data storage capacity. The parameters under which the memory cells configured as SLC are migrated to higher density memory cells can be fixed at design time.

Memory devices can have different constraints for the SLC cache. For example, a memory device can operate in a SLC mode and program (write) every block of the memory device in SLC memory cells until memory device firmware runs out of free blocks to write to. Thus, physical saturation would occur at approximately 33% capacity of the logical saturation because all potential memory cells, which could have been programmed as TLC memory cells, are instead programmed as SLC memory cells. The firmware then switches from the SLC mode to a TLC mode and initiates garbage collection on all blocks written in SLC mode.

Garbage collection is a process to recover free space by relocating pages with data to new blocks, and erasing old blocks. Specifically, a block can include valid data pages and data pages that are no longer needed (e.g., stale pages). Garbage collection generally involves copying only the valid data pages from a source block to a destination block and then erasing the source block to free the space.

The garbage collection, when running concurrently with other operations of the memory device, can result in degraded performance of the memory device. Alternatively, the firmware can initiate forced SLC caching where the firmware continues to program in SLC mode and performs garbage collection.

In another example, the memory device firmware programs only blocks available from over-provisioning in SLC mode. Accordingly, the memory device firmware can program enough TLC blocks to write the entire capacity of the memory device without a need for garbage collection. In yet another example, the memory device firmware programs more blocks in SLC mode than available from over-provisioning. Accordingly, the memory device firmware can engage in "light" garbage collection due to the amount of free blocks on the memory device. Light garbage collection can minimize performance degradation by running when the memory device is idle.

Thus, a memory device can limit the SLC cache to a small size in order to support full sequential logical fill without reclamation operations. The SLC cache size can be confined by available over-provisioning. This allows the memory device firmware to program enough higher density blocks to write the entire capacity of the memory device without a need for garbage collection.

Over-provisioning refers to keeping above one the ratio of the physical capacity of a memory device and the logical capacity presented through the operating system as available to a host system. For example, over-provisioning can be measured by a number of excess valid blocks, memory pages, sub-blocks, half-blocks, or any other management units in a memory device. During manufacturing, each logical unit (LU) on a memory device can have a varying number of blocks that meet a minimum system requirement for use, referred to as "valid blocks." Blocks that don't meet the system requirement can be marked as "bad blocks," where none of the pages on a bad block are typically accessible. An LU at or near the system requirement of valid blocks can be categorized as "marginal." An LU with a surplus of valid blocks can be categorized as "extra healthy." Thus, a memory devices can have a combination of extra healthy LUs and marginal LUs. Manufacturers generally determine a bad block distribution on a single LU of each memory device of a batch, and use that bad block distribution to estimate a bad block distribution for each entire memory device, which include different amounts of multiple LUs (e.g., 4 LUs, 8 LUs, 16 LUs, etc.). The SLC cache size is then fixed on each memory device based on the memory devices with the least amount of over-provisioning in the batch at an acceptable yield point (e.g., such that at least a certain percentage of the memory devices in the batch would have at least a certain number of valid blocks).

As such, available over-provisioning for a memory device is, in part, determined by an estimated bad block distributions of memory device batches, where SLC cache size is fixed on each memory device based on the memory devices with the least amount of over-provisioning in the batch. Therefore, memory devices with larger available over-provisioning would not use the additional available memory.

Aspects of the present disclosure address the above and other deficiencies by implementing cache management based on memory device over-provisioning. Specifically, a memory sub-system can determine a number valid blocks in each LU of a memory device. The memory sub-system can then determine a surplus amount of the valid blocks by subtracting a threshold value from the number of valid blocks in each LU. The threshold value can be based on a system requirement for a minimum amount of valid blocks in a LU. The memory sub-system can then configure a cache size, such as a SLC cache, of the memory device based on the surplus amount of valid blocks. For example, a memory sub-system has two 2 GB LUs (a first LU and a second LU). Each LU on the memory sub-system can have two planes, each of which includes 1,024 blocks (thus 2,048 blocks, each holding 128 Kb of data, on the LU). A system requirement for a minimum amount of valid blocks can be 2000 blocks per LU. The memory sub-system can then determine that the first LU has 2040 valid blocks, and the second LU has 2005 valid blocks. The memory sub-system can then subtract the threshold value of 2000 from the 2040 valid blocks of the first LU, and subtract the threshold value of 2000 from the 2005 valid blocks of the second LU, which yields 40 surplus valid blocks on the first LU and 5 surplus valid blocks on the second LU. The memory sub-system can then configure the cache size by based on the surplus amount of valid blocks (e.g., 40+5=45 surplus valid blocks), which yields a cache size of 5,760 Kb.

Advantages of the present disclosure include, but are not limited to, a larger cache size on memory devices, which allows the memory devices to deliver maximum write performance for longer bursts of new data, at zero additional cost. Specifically, when considering the pressure to meet binary densities and steady state sequential benchmarks, an SLC cache size is typically budgeted tightly. The present disclosure provides an adaptive SLC cache size on a per memory device basis as a function of the LU composition of the memory device. This enables a larger over-provisioning allotment, which can be translated to a larger SLC cache size. For example, a 256 GB TLC memory device with 1% additional over-provisioning can equate to 1 GB surplus SLC cache size. This increase burst size is noticeable in performance benchmarks. Thus, the memory device experiences improved performance and energy consumption.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory devices (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLCs) can store one bit per cell. Other types of memory cells, such as multi-level cells (MLCs), triple level cells (TLCs), quad-level (QLCs), and penta-level cells (PLCs) cells, can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion and a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

A portion of the memory device 130 and/or 140 can be reserved for an SLC cache. SLC caching stores incoming host data in SLC memory cells prior to being written to higher density memory cell (e.g., MLC, TLC, QLC, etc.). Data caching is performed to avoid loss of data and/or to minimize an amount of time for data received from the host system 120 to be programmed to memory device 130 and/or 140. For example, the memory sub-system 110 can receive host data to be stored in MLC memory cells, and initially stores the host data in SLC memory cells, which have a faster write time. The memory sub-system 110 then copies the host data from the SLC memory cells to MLC memory cells. The potential loss of data resulting from power loss during the write operation to the MLC memory cells is avoided because all of the data stored in the SLC memory cells can be retrieved after power is restored. Once data is transferred from a block of the SLC cache to a higher density memory cell, the block can be invalidated, and a garbage collection operation can be performed to erase the data on the block, thereby allowing the block to be programmed with new data.

The memory sub-system 110 includes a cache management component 113 that can be used to manage the SLC cache. In some embodiments, the controller 115 includes at least a portion of the cache management component 113. For example, the controller 115 can include a processor 117 (processing device) configured to execute instructions stored in local memory 119 for performing the operations described herein. In some embodiments, the cache management component 113 is part of the host system 120, an application, an operating system, or an external device. In some embodiments, the cache management operations described herein can be performed at pat of the post-production calibration process of the memory sub-system.

The cache management component 113 can set an SLC cache size based on memory device over-provisioning. Specifically, the cache management component 113 can determine the number of valid blocks in each LU of memory device 130 and/or 140. A valid block is a block that meet system requirements, whereas blocks that don't meet the system requirements can be marked as "bad blocks," of which none of the pages are typically accessible by the controller 115. The cache management component 113 can determine a surplus amount of the valid blocks on each LU. For example, the cache management component 113 can subtract a threshold value from the number of valid blocks. The threshold value can include a system requirement for a minimum amount of valid blocks required to exist in a LU. Valid blocks above the system requirement minimum are counted as surplus. The cache management component 113 can configure a size of an SLC cache based on, at least, the surplus amount of valid blocks. The cache management component 113 can use other sources of over-provisioning in addition to the surplus amount of valid blocks for setting the SLC cache size, such as, but not limited to, a binary/decimal unit divergence of the memory sub-system 110, a manufacture's decision, free space on the memory devices 130, 140, etc.

For example, a memory device 130 and/or 140 includes two 2 GB LUs (a first LU and a second LU). Each LU can have two planes, each of which includes 1,024 blocks (thus 2,048 blocks, each holding 128 Kb of data, on the LU). A system requirement for a minimum amount of valid blocks can be 2000 blocks per LU. The memory sub-system can then determine that the first LU has 2040 valid blocks, and the second LU has 2005 valid blocks. The cache management component 113 can then subtract the threshold value of 2000 from the 2040 valid blocks of the first LU, and subtract the threshold value of 2000 from the 2005 valid blocks of the second LU, which yields 40 surplus valid blocks on the first LU and 5 surplus valid blocks on the second LU. The cache management component 113 can then configure the cache size by based on the surplus amount of valid blocks (e.g., 40+5=45 surplus valid blocks), which yields a cache size of 5,760 Kb.

In one example, the cache management component 113 can set the SLC cache size as a fixed size during manufacturing, testing, or calibration of the memory-subsystem 110 (e.g., prior to shipment to an end user). In another example, the cache management component 113 can dynamically change or update the SLC cache size during the lifetime of the memory sub-system 110. In yet another example, the SLC cache size can be updated by the host system 120. For example, the controller 115 can receive commands or operations from the host system 120 indicating one or more of an updated valid block threshold value, a SLC cache size, an updated amount of surplus valid blocks, etc. Further details with regards to the operations of the cache management component 113 are described below.

Figure 2:
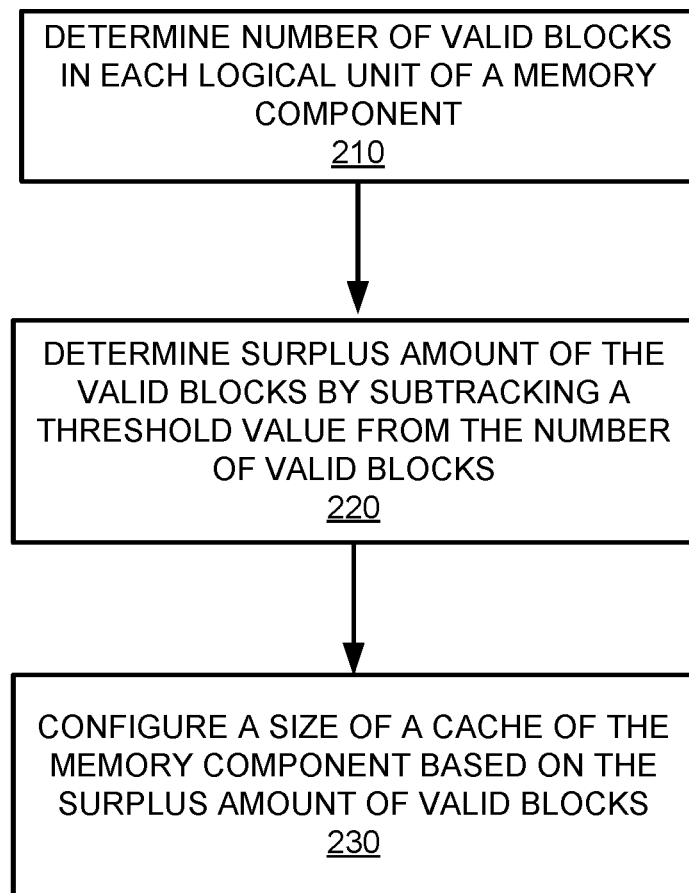
FIG. 2 is a flow diagram of an example method to configure a size of a cache based on available over-provisioning, in accordance with some embodiments of the present disclosure.

FIG. 2 is a flow diagram of an example method 200 to configure a size of a SLC cache based on available over-provisioning, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the cache management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 200 is described using blocks. It is noted that blocks are used by way of example, and that any management unit can be used in place of the blocks, such as but not limited to, memory pages, sub-blocks, half-blocks, etc. A half-block can include half of the memory pages of a block. A sub-block can include any portion of memory pages of a block.

At operation 210, the processing logic determines a number of valid blocks in one or more LUs of a memory device. A valid block is a block that meet a system requirement, such as, for example, having a minimum amount or percentage of functional pages. In a first example, the number of valid blocks can be determined by, determining a number of total blocks in a given LU, then determining a number of bad blocks in the LU (e.g., blocks whose pages are typically inaccessible by a controller), and then subtracting the number of bad blocks from the total number of blocks in the LU. In another example, the number of valid blocks can be determined by calculating an amount of block on the LU whose pages are accessible by the memory sub-system controller.

At operation 220, the processing logic determines a surplus amount of valid blocks on each LU. For example, the processing logic can subtract a threshold value from the number of valid blocks. The threshold value can represent a system requirement for a minimum amount of valid blocks required to exist in a LU. Valid blocks above the system requirement minimum are calculated as surplus.

At operation 230, the processing logic configures a size of the SLC cache of the memory device based on, at least, the surplus amount of valid blocks. Each LU in a memory device can have no valid blocks above the minimum system requirement (e.g., a marginal LU), or one or more valid blocks above the minimum system requirement (e.g., extra healthy LU). The valid blocks above the minimum system requirement for each LU are calculated, and the SLC cache size is configured based on this surplus of valid blocks. For example, the SLC cache size can be configured using all of the surplus valid blocks (e.g., if there are 100 surplus valid blocks, the SLC cache size is configured using 100 valid blocks). In another example, the SLC cache size can be configured using a portion of the surplus valid blocks. The portion can be based on a percentage of the surplus valid blocks, a fixed amount of the surplus valid blocks, etc. As such, each of a plurality of memory devices can have different sized SLC caches.

In addition to the surplus valid blocks, the SLC cache can be configured using memory blocks from one or more additional sources of over-provisioning. A first source of over-provisioning can relate to a binary/decimal unit divergence, which is a difference between the decimal computation and the binary computation of the capacity of the memory device. Specifically, memory device manufacturers use the term gigabyte (GB) to represent a "decimal GB" or 1,000,000,000 ($=10^9$) bytes. Because flash memory devices are assembled in powers of two, calculating the physical capacity of a flash memory device would be based on 1,073,741,824 ($=2^{30}$) per "binary GB" or GiB. The difference between these two values is 7.37% ($=(2^{30}-10^9)/10^9 \times 100\%$). Therefore, for example, a 128 GB SSD memory device with 0% additional over-provisioning would provide 128,000,000,000 bytes to the host system (out of 137,438,953,472 total). However, the 7.37% binary/decimal unit divergence over-provisioning cannot all be counted in the total over-provisioning capacity as some storage space is needed for the controller to keep track of non-operating system data. The 7.37% figure can extend to 9.95% in the terabyte range, as manufacturers use a further grade of binary/decimal unit divergence.

Another source of over-provisioning can relate to a design parameter. Specifically, memory device can be factory set with over-provisioning to maintain a minimum performance and memory life. Generally, this kind of over-provisioning is set at 0%, 7%, or 28%, based on the difference between the decimal gigabyte of the physical capacity and the decimal gigabyte of the available space to the user. For example, a manufacturer might publish a specification for their SSD at 100, 120 or 128 GB based on 128 GB of possible capacity. This difference is 28%, 7% and 0% respectively and is the basis for the manufacturer claiming they have 28% of over-provisioning on their drive. This does not count the additional 7.37% of capacity available from the difference between the binary/decimal unit divergence.

A yet another source of over-provisioning can relate to the free space on the memory device. Specifically, free space can be identified by an operating system using a TRIM command, which allows an operating system to inform the memory device which blocks are no longer considered in use and can be wiped internally. As stored user data changes, the free space is used automatically as over-provisioning. Alternatively, some memory devices provide a utility that permits a user of the host system to select additional over-provisioning. Furthermore, if any memory device is set up with an overall partitioning layout smaller than 100% of the available space, that unpartitioned space can be automatically used by the memory device as over-provisioning as well. This source of over-provisioning can take away from user capacity, either temporarily or permanently, but it gives back reduced write amplification, increased endurance, and increased performance.

Figure 3:
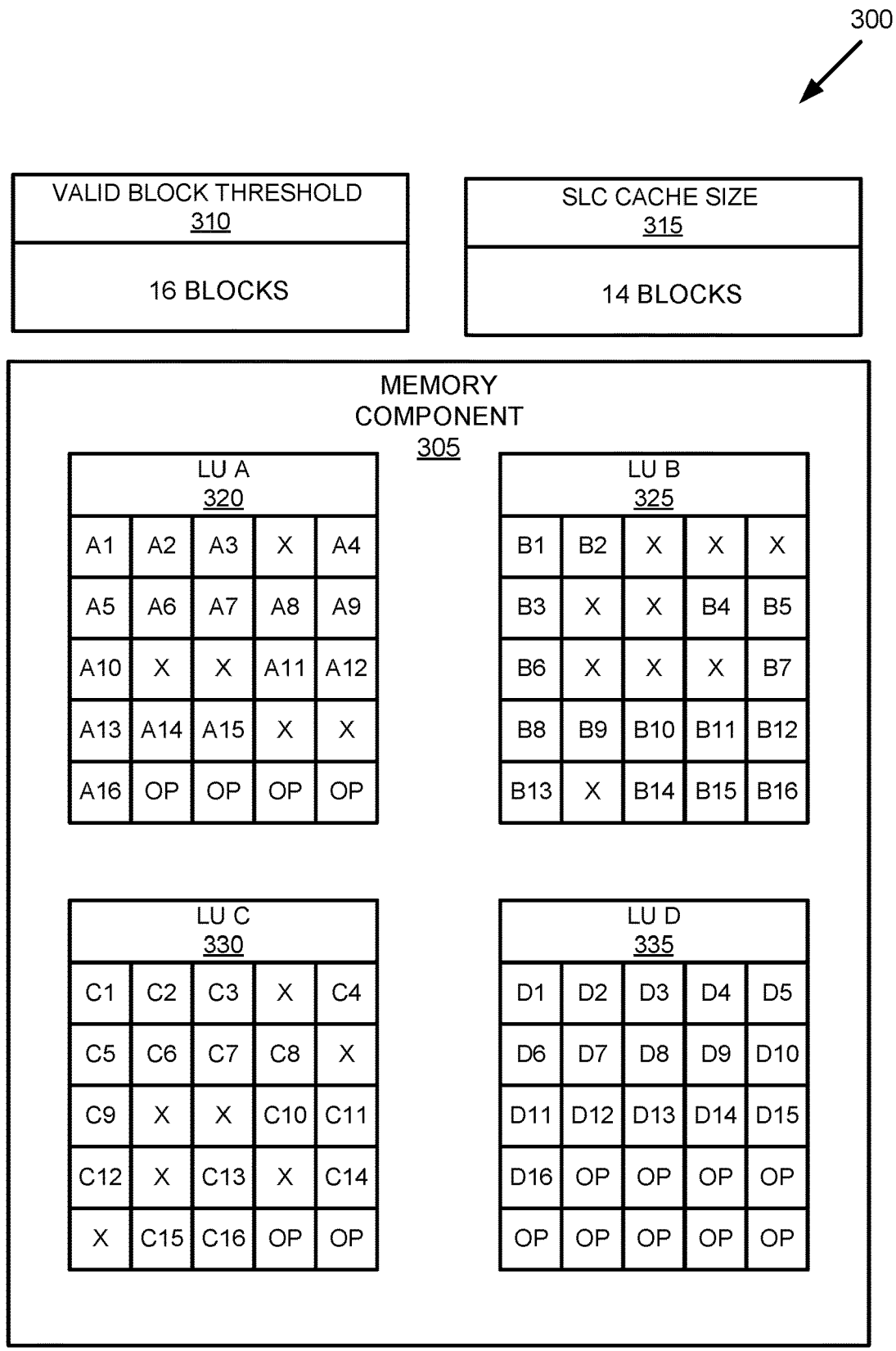
FIG. 3 is an illustration of a memory sub-system configuring a size of a cache based on available over-provisioning, in accordance with some embodiments of the present disclosure.

FIG. 3 is an illustration of a memory sub-system 300 determining an SLC cache size based on a surplus amount of valid blocks, in accordance with some embodiments of the disclosure. By way of example, a valid block threshold 310 is set to 16 blocks per LU. Memory device 305 includes four LUs: LU A 320, LU B 325, LU C 330, and LU D 335. For illustrative purposes, each LU can include a maximum of 25 blocks. However, it should be understood that the amount of blocks within a LU is generally set as $2^x$, where x is a positive integer. LU A 320 includes 5 bad blocks, and 20 valid blocks. Thus, 16 blocks (A1-A16) can be configured for primary memory storage, and 4 blocks, labeled OP, (e.g., surplus of valid blocks) can be reserved for the SLC cache. LU B 325 includes 9 bad blocks, and 16 valid blocks. Thus, 16 blocks (B1-B16) can be configured for primary memory storage, and no blocks remain to be reserved for the SLC cache. LU C 330 includes 7 bad blocks, and 18 valid blocks. Thus, 16 blocks (C1-C16) can be configured for primary memory storage, and 2 blocks, labeled OP, can be reserved for the SLC cache. LU D 335 include no bad blocks, and 25 valid blocks. Thus, 16 blocks (D1-D16) can be configured for primary memory storage, and the remaining 9 blocks, labeled OP, can be reserved for the SLC cache. Accordingly, SLC cache size 315 for memory device 305 is set to 14 blocks.

Figure 4:
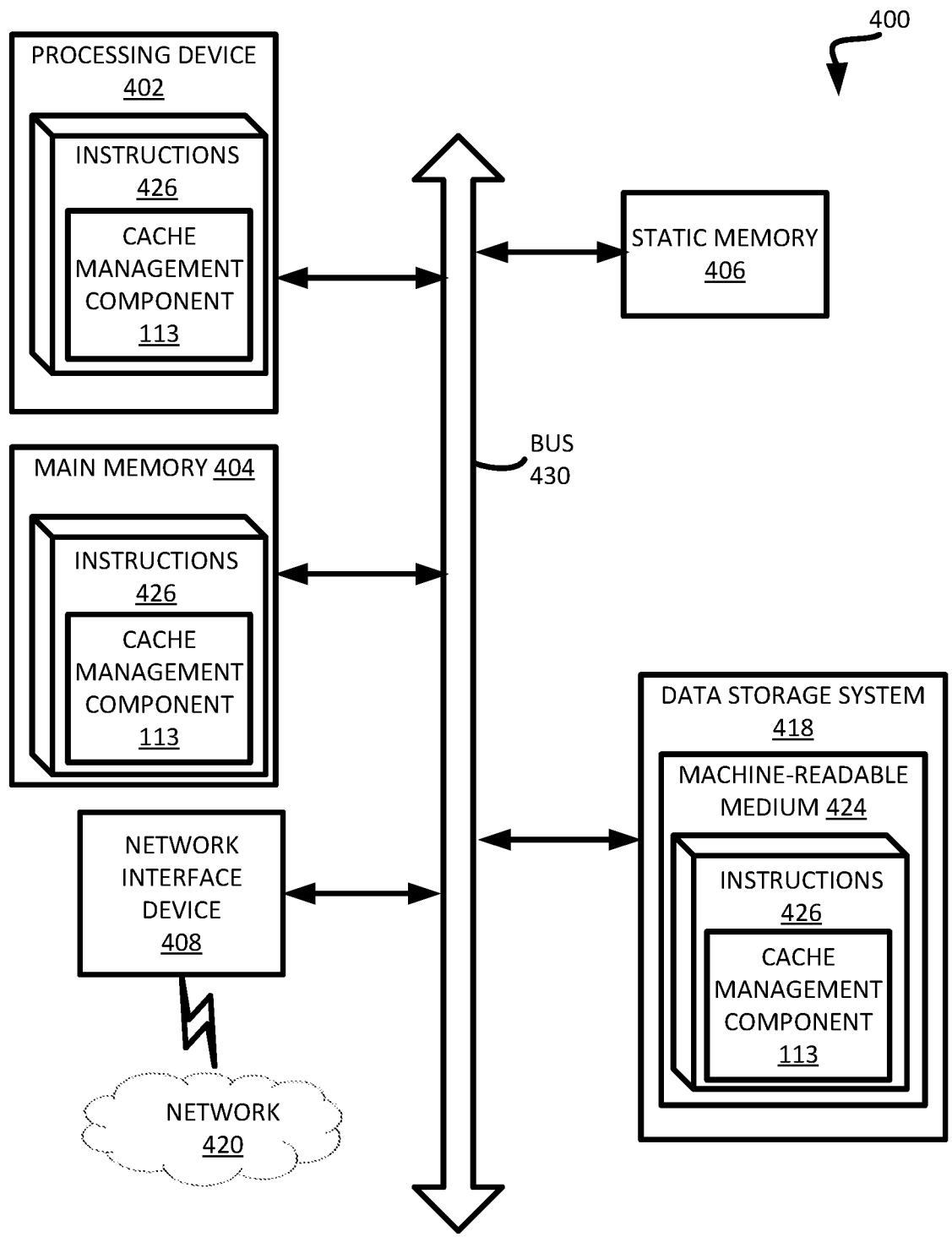
FIG. 4 is a block diagram of an example computer system in which implementations of the present disclosure can operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the cache management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a data relocation component (e.g., the cache management component 113 of FIG. 1). While the machine-readable storage medium 424 is shown For example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
determining, by a processing device, an amount of valid management units in a memory device of a memory sub-system;
determining a surplus amount of valid management units on the memory device based on a minimum system requirement of valid management units; and
configuring a size of a cache of the memory device based on the surplus amount of valid management units.

2. The method of claim 1, wherein a valid management unit is a management unit having at least a minimum amount of functional pages.

3. The method of claim 1, wherein a number of bits per cell in the cache of the memory device is less that a number of bits per cell in the memory device.

4. The method of claim 1, wherein configuring the size of the cache of the memory device is performed during calibration of the memory sub-system.

5. The method of claim 1, further comprising: receiving, from a host system in communication with the memory sub-system, a command specifying the threshold value associated with the surplus amount.

6. The method of claim 1, further comprising: receiving, from a host system in communication with the memory sub-system, a command specifying an updated surplus amount of valid management units.

7. The method of claim 1, wherein the size of the cache of the memory device is configured using at least a portion of the surplus amount of valid management units.

8. The method of claim 1, wherein each valid management unit is at least one of: a block, a sub-block, a half-block, or a memory page.

9. The method of claim 1, wherein determining the surplus amount of valid management units comprises subtracting a threshold value from the amount valid management units.

10. A system comprising:
a memory device; and
a processing device, coupled to the memory device, to perform operations comprising:
determining an amount of valid management units in a memory device of a memory sub-system;
determining a surplus amount of valid management units on the memory device based on the amount of valid blocks based on a minimum system requirement of valid management units; and
configuring a size of a cache of the memory device based on the surplus amount of valid management units.

11. The system of claim 10, wherein a valid management unit is a management unit having at least a minimum amount of functional pages.

12. The system of claim 10, wherein a number of bits per cell in the cache of the memory device is less that a number of bits per cell in the memory device.

13. The system of claim 10, wherein configuring the size of the cache of the memory device is performed during calibration of the system.

14. The system of claim 10, wherein the operations further comprise: receiving, from a host system in communication with the memory sub-system, at least one of a command specifying a threshold value or a command specifying an updated surplus amount of valid management units.

15. The system of claim 10, wherein each valid management unit is at least one of: a block, a sub-block, a half-block, or a memory page.

16. A non-transitory computer-readable storage medium comprising instructions that, when executed by a processing device, cause the processing device to perform operations, comprising:
determining an amount of valid management units in a memory device of a memory sub-system;
determining a surplus amount of valid management units on the memory device based on the amount of valid blocks based on a minimum system requirement of valid management units; and
configuring a size of a cache of the memory device based on the surplus amount of valid management units.

17. The non-transitory computer-readable storage medium of claim 16, wherein a valid management unit is a management unit having at least a minimum amount of functional pages.

18. The non-transitory computer-readable storage medium of claim 16, wherein a number of bits per cell in the cache of the memory device is less that a number of bits per cell in the memory device.

19. The non-transitory computer-readable storage medium of claim 16, wherein the operations further comprise: receiving, from a host system in communication with the memory sub-system, a command specifying a threshold value associated with the surplus amount.

20. The non-transitory computer-readable storage medium of claim 16, wherein the operations further comprise: receiving a command, from a host system in communication with the memory sub-system, indicating an updated surplus amount of valid management units.

* * * * *